United States Patent
Kuntze et al.

(10) Patent No.: US 11,305,822 B2
(45) Date of Patent: Apr. 19, 2022

(54) LIFTGATE ARRANGEMENT HAVING A CARBON FIBER REINFORCED SHEET MOLDING COMPOUND REINFORCEMENT

(71) Applicant: Magna Exteriors Inc., Concord (CA)

(72) Inventors: Christopher John Kuntze, Goodrich, MI (US); Mark P. Birka, Northville, MI (US); Sinisa Andrasic, Kitchener (CA); Scott Varisto, St. Clair, MI (US); William J. J. Harney, Toronto (CA)

(73) Assignee: MAGNA EXTERIORS, INC., Concord (CA)

(*) Notice: Subject to any disclaimer, the term of this patent is extended or adjusted under 35 U.S.C. 154(b) by 202 days.

(21) Appl. No.: 16/696,058

(22) Filed: Nov. 26, 2019

(65) Prior Publication Data

US 2020/0164929 A1    May 28, 2020

Related U.S. Application Data

(60) Provisional application No. 62/771,674, filed on Nov. 27, 2018.

(51) Int. Cl.
*B62D 29/04*    (2006.01)
*B60J 5/10*    (2006.01)
*B62D 27/02*    (2006.01)

(52) U.S. Cl.
CPC ............ *B62D 29/048* (2013.01); *B60J 5/107* (2013.01); *B62D 27/02* (2013.01)

(58) Field of Classification Search
CPC ...... B62D 27/02; B62D 27/00; B62D 29/048; B62D 29/04; B60J 5/107; B60J 5/10
See application file for complete search history.

(56) References Cited

U.S. PATENT DOCUMENTS

2016/0152121 A1\* 6/2016 Ikeda ...................... B60J 5/101
49/501

FOREIGN PATENT DOCUMENTS

| CN | 108116205 A | \* | 6/2018 | ............ B60J 5/0481 |
| WO | WO-2015052655 A1 | \* | 4/2015 | ............... B60J 5/107 |
| WO | WO-2019100146 A1 | \* | 5/2019 | ............. F03D 80/50 |

\* cited by examiner

*Primary Examiner* — Lori L Lyjak
(74) *Attorney, Agent, or Firm* — Warn Partners, P.C.

(57) ABSTRACT

A liftgate arrangement including a thermoplastic inner panel with an outer surface and an inner surface. The liftgate arrangement further includes one or more carbon fiber sheet mold compound reinforcements connected to and extending across a portion of the outer surface of the inner panel. The one or more carbon fiber sheet mold compound reinforcements also includes a channel extending between two openings on the one or more carbon fiber sheet mold compound reinforcements. The one or more carbon fiber sheet mold compound reinforcements are used to strengthen the inner panel at desired locations.

22 Claims, 4 Drawing Sheets

LIFTGATE ARRANGEMENT HAVING A CARBON FIBER REINFORCED SHEET MOLDING COMPOUND REINFORCEMENT

FIELD OF THE INVENTION

The present invention relates to a liftgate having a carbon fiber reinforced sheet molding compound reinforcement.

BACKGROUND OF THE INVENTION

One of the current trends in the automobile industry is to lower vehicle weight to help achieve better fuel economy, thus helping to meet fuel economy standards and to offset the higher fuel prices. Another trend is that there is a broader range of vehicle models, which in turn reduces the volume of vehicles produced on a per model basis. Liftgates are traditionally made from stamped steel panels that are heavy and have a high tooling cost and are susceptible to corrosion.

In certain applications where liftgates are made from composite materials, metal plates are used to strengthen the liftgate. The use of steel plates adds weight, can be difficult to attach and increases the assembly complexity. It is therefore desirable to design liftgates that have reinforcements that are easier to assemble, require less specific attachment points and provide an equivalent or greater level of strength than using metal inserts. It is further desirable to develop reinforcement structures that provide channels or apertures that can be used for the attachment of other structures the liftgate.

SUMMARY OF THE INVENTION

The present invention is directed to a liftgate arrangement including a thermoplastic inner panel with an outer surface and an inner surface. The thermoplastic inner panel further includes a lower perimeter surface area that includes the beltline, extending across a portion of the entire width of the inner panel. The liftgate arrangement further includes one or more carbon fiber sheet mold compound reinforcements connected to and extending across a portion of the outer surface of the inner panel.

The one or more carbon fiber sheet mold compound reinforcements are used to strengthen the inner panel at desired locations. For example in one embodiment, the one or more carbon fiber sheet mold compound reinforcements are used to strengthen the inner panel at a location often referred to as the D pillar. The one or more carbon fiber sheet mold compound reinforcements also include a channel extending between two openings on the one or more carbon fiber sheet mold compound reinforcements. The channel has many purposes, such as, providing strength to the carbon fiber sheet mold compound reinforcement by providing a closed cell structure, providing a plenum or ductwork for heating and cooling passages, providing passage for electrical wiring harnesses or hoses for fluids such as washer fluid; or even a recess for receiving other accessories such as taillights, wipers, speakers, locks or latches, actuators or other objects. The channel can also be filled with a structural foam 25 (shown in FIG. 1) to add further strength.

The one or more reinforcements also include one or more mount surface areas formed on an exterior surface of the one or more carbon fiber sheet mold compound reinforcements. The mount surface areas can be used for the attachment of tappet plates, hinges or other structures which would allow for the connection of other components such as hinges, pneumatic actuators, latch plates or other structures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
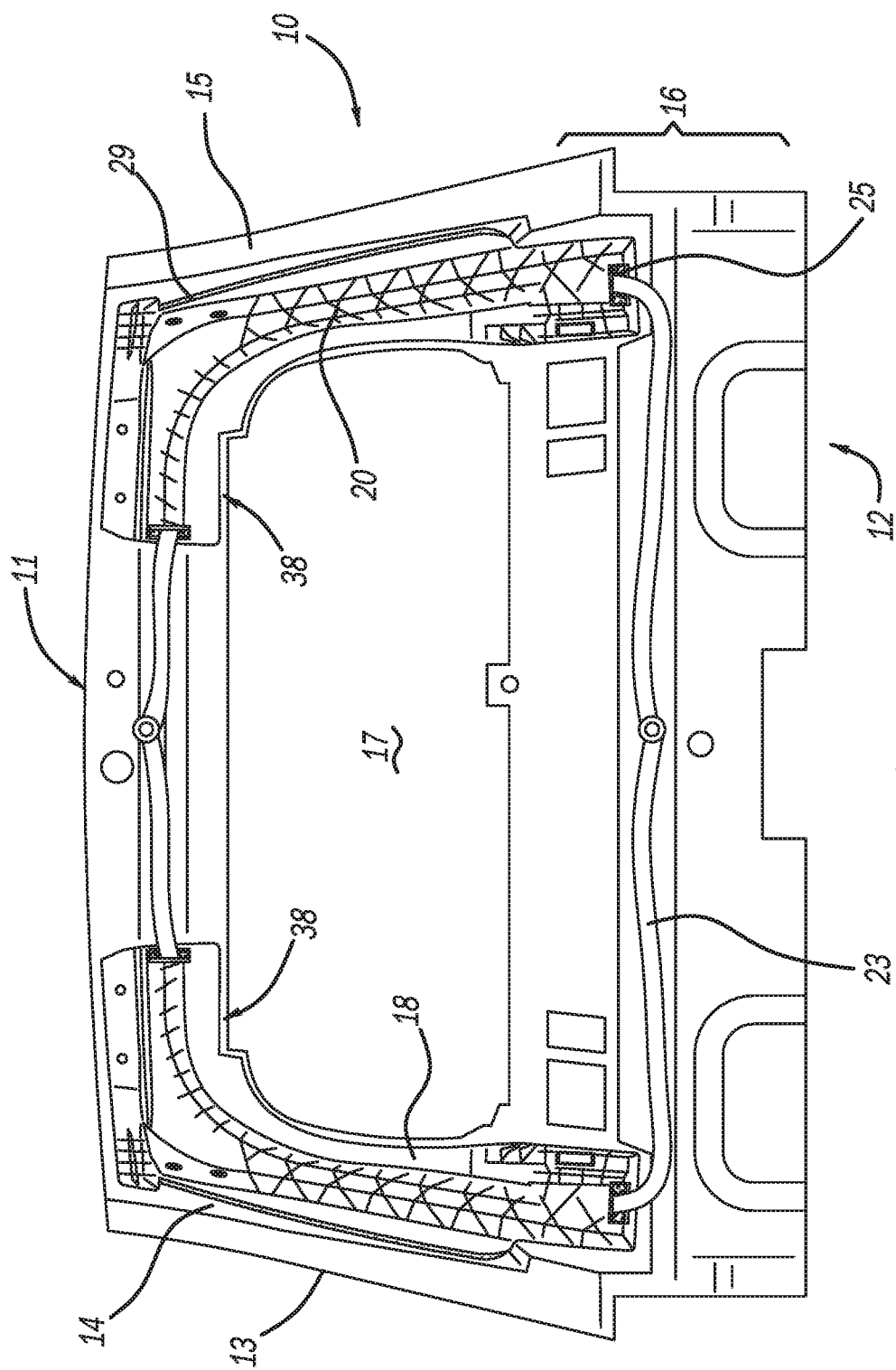
FIG. 1 is a rear perspective view of a liftgate inner panel with two carbon sheet mold compound reinforcements attached.

The following description of the preferred embodiment(s) is merely exemplary in nature and is in no way intended to limit the invention, its application, or uses.

Referring now to the figures as shown there is a liftgate structure arrangement 10 having an inner panel 12 formed of polymeric material. The inner panel 12 includes an outer surface 14 to which other structures are attached. The inner panel 12 forms the inner panel of the liftgate to which other structures are connected to or formed on. Other structures include support members, which will be discussed later as well as outer exterior show surface panels, taillights, door latches etc. The inner panel 12 also includes a lower perimeter surface area 16 that includes the belt line, located below an aperture 17 used to form a rear window of the liftgate arrangement 10. Extending upward from the lower perimeter surface area 16 are to pillars 13, 15 that are referred to sometimes as D pillars when the liftgate structure arrangement 10 is connected to a vehicle. The pillars 13, 15 extend between the lower perimeter surface area 16 and a header 11. The header 11, pillars 13, 15 and lower perimeter surface area 16 define the boundary of the aperture 17.

In certain applications the inner panel 16 needs additional structural support. Depending on the application, support can be needed at any location on the inner panel 12, including but not limited to the area of the pillars 13, 15, header 11, beltline or lower surface area 16.

Figure 3:
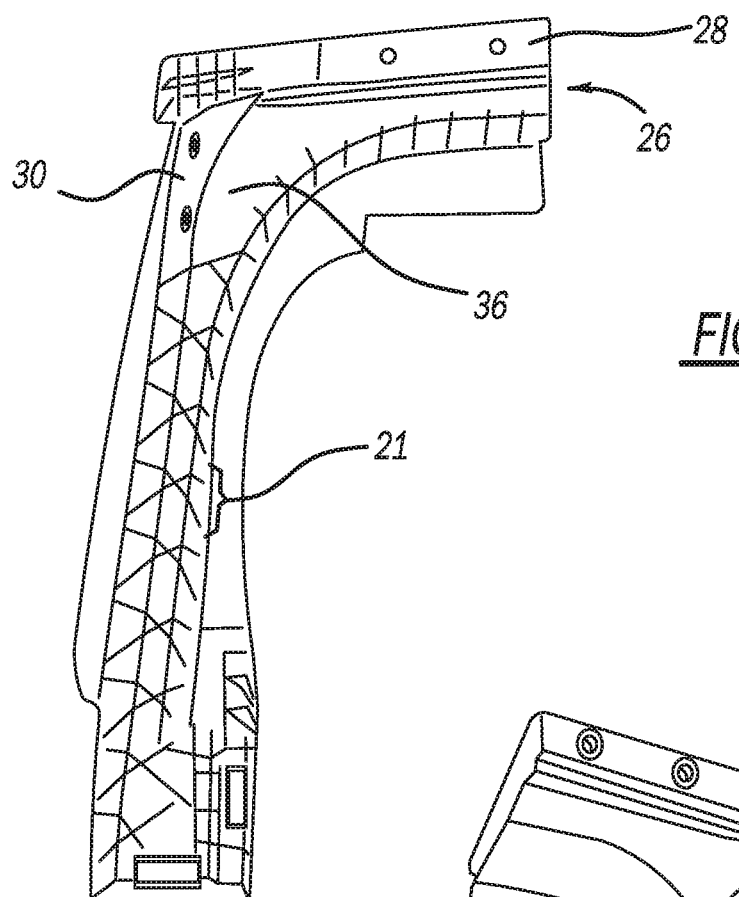
FIG. 3 is a front perspective view of one carbon fiber sheet mold compound reinforcement.
Figure 4:
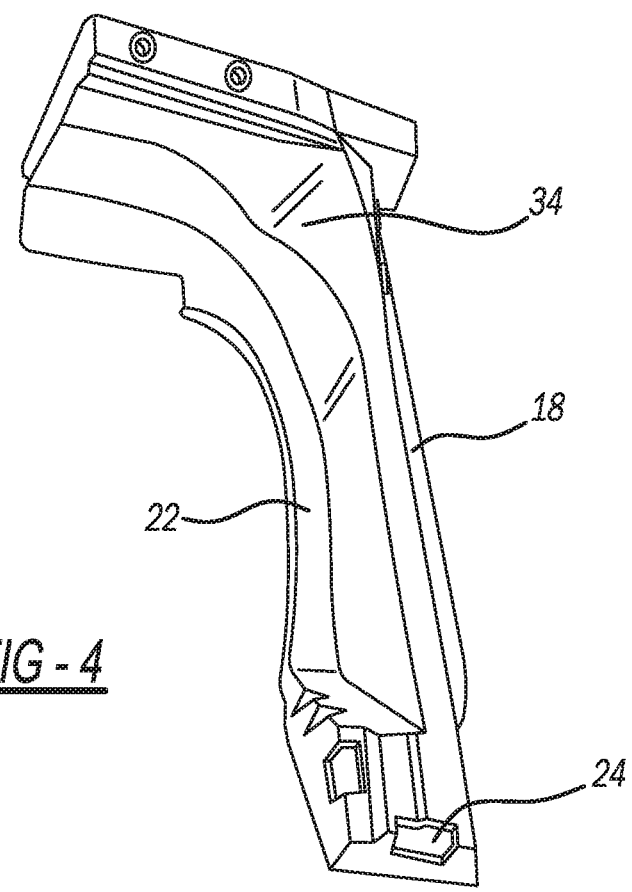
FIG. 4 is a rear perspective view of one carbon fiber sheet mold compound reinforcement.

In order to provide the additional support to the inner panel, prior art applications have used metal plates connected to the inner panel. The present application provides carbon fiber sheet mold compound reinforcements 18, 20 that are formed of a reinforced composite material. Referring now to FIGS. 3 and 4 the carbon fiber sheet mold compound reinforcement 18 has a channel 22 extending between two openings 24, 26. The carbon fiber sheet mold compound reinforcement 18 also includes ribs 21 that are formed on the surface opposite the channel 22 that add strength to the carbon fiber sheet mold compound reinforcements 18. The channel 22 and ribs 21 are formed by compression molding a blank formed of resin and carbon fiber material. While any suitable resin can be used, it is within the scope of this invention for a vinyl ester resin to be used in combination with carbon fibers. The carbon fibers are preferably chopped carbon fibers having a length general between about 5 mm to about 35 mm, preferably 15 mm to about 30 mm and ideally about 20 mm to about 25 mm. In another aspect of the invention the chopped carbon fibers are less than about 25 mm. The methods of compression molding the carbon fiber sheet mold compound reinforcements 18, 20 include processes where the carbon fiber sheet mold compound reinforcements 18, 20 are formed as one piece, two piece, multiple pieces, and subassembled, or installed as loose pieces.

The channel 22 can serve several purposes and can be further reinforced with structural adhesives or structural foam 25, but could also be used for the routing of a retention tether 23 through different locations on the inner panel 12. It is also within the scope of the invention to use the channel 22 for the routing of wire harnesses or water lines, channels for connecting lights, wiper motors, window actuators, door actuators or use for as HVAC ductwork. It is within the scope of this invention for carbon fiber sheet mold compound reinforcement 20 to also have openings and a channel and ribs similar the reinforcement 18 shown in FIGS. 3 and 4

Figure 2:
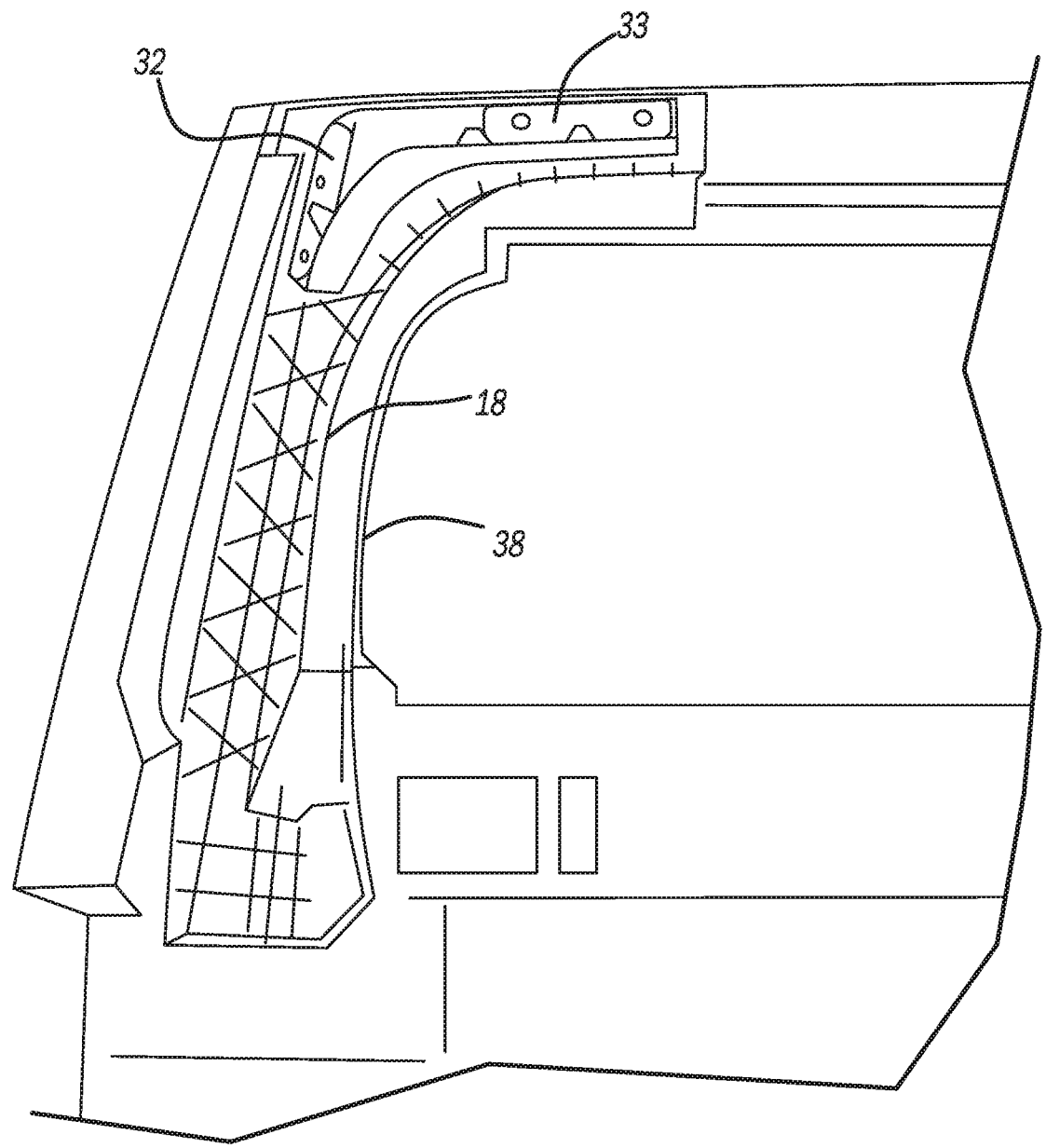
FIG. 2 is an enlarged plan view of one carbon fiber sheet mold compound reinforcement connected to a liftgate inner panel with a hinge plate connected.

Referring now to FIGS. 2, 3 and 4 the details of the carbon fiber sheet mold compound reinforcements 18, it is within the scope of this invention for the carbon fiber sheet mold compound reinforcement 20 to include the same features as reinforcement 18 but in mirror image. Carbon fiber sheet mold compound reinforcement 18 in FIGS. 2 and 3 include an outside surface 36 of the carbon fiber sheet mold compound reinforcement 18, while FIG. 4 shows the inside surface 34 of the carbon fiber sheet mold compound reinforcement 18. The inside surface 34 rests against the attachment surface 38 on the inner panel. The inside surface 34 also includes a channel portion 22 of the inside surface 34 that spaced apart from the attachment surface 38 of the inner panel 12 to form the channel 22.

The outside surface 36 has mount areas 28, 30 which are surfaces where a bracket 32, 33 can be connected to the carbon fiber sheet mold compound reinforcement 18. The bracket 32, 33 can be a support plate for connection of a hinge or strut to the carbon fiber sheet mold compound reinforcement 18.

The connection between the carbon fiber sheet mold compound reinforcement 18, 20 and the attachment surface 38 of the inner panel 12 is accomplished using many different techniques. It is within the scope of this invention for the carbon fiber sheet mold compound reinforcement 18, 20 to be connected with a mechanical attachment 29 that includes adhesive, fasteners, pinching in place or flanged. It is further with scope of this invention for the connection or attachment of the carbon fiber sheet mold compound reinforcement 18, 20 and the inner panel 12 to be accomplished using resistive implant welding, heat staking.

Figure 5:
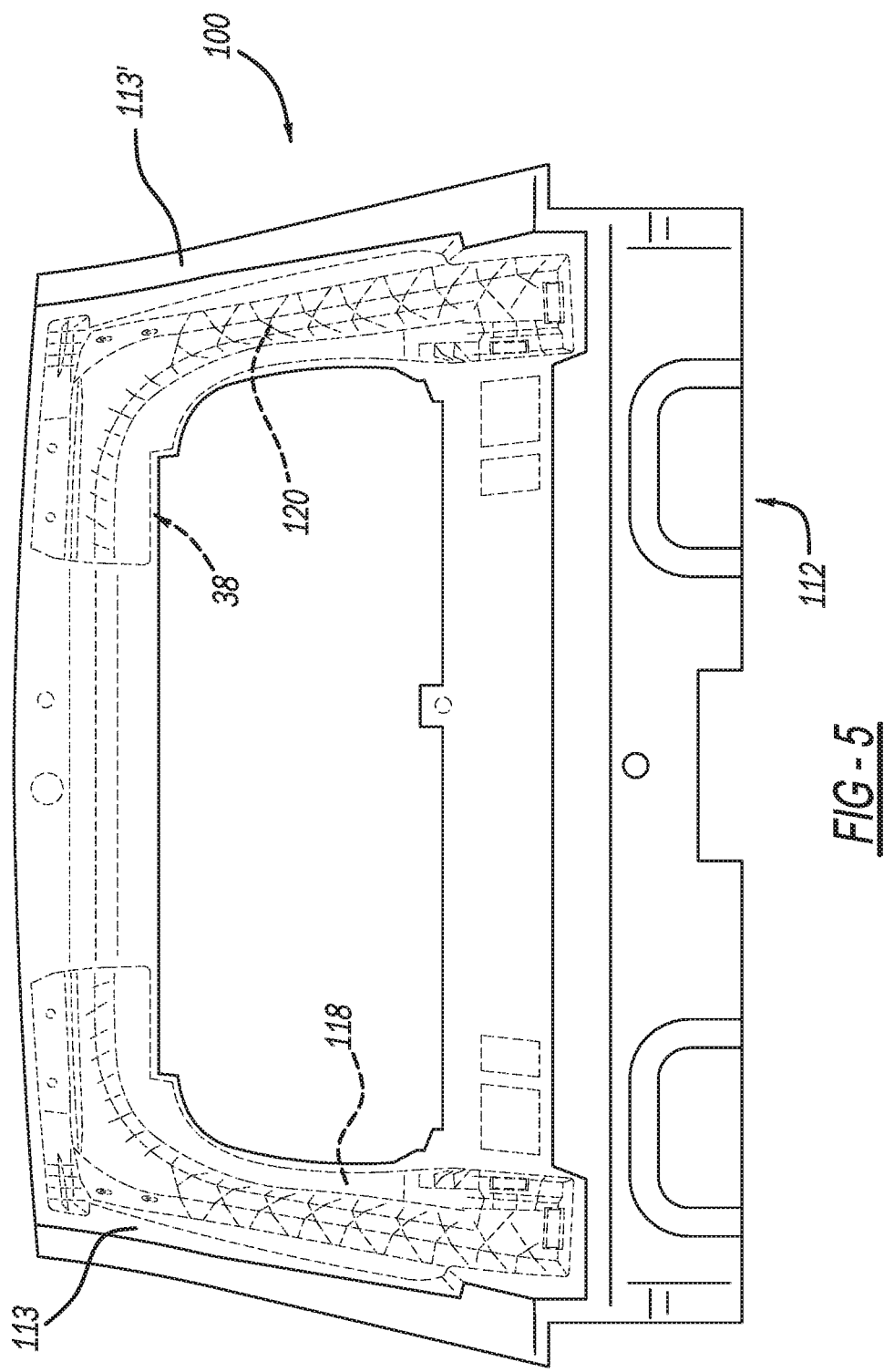
FIG. 5 is a rear perspective view of a liftgate inner panel with two carbon sheet mold compound reinforcements attached, according to another embodiment of the invention.

In another embodiment of the invention, shown in FIG. 5 a liftgate structure arrangement 100 is shown where carbon fiber sheet mold compound 118, 120 is insert molded to the liftgate structure arrangement 100. The carbon fiber sheet mold compound reinforcement 118, 120 is placed into the mold prior to formation of the inner panel 112. During formation of the inner panel 112 the molten resin of the inner panel will flow around and partially encapsulate the carbon fiber sheet mold compound reinforcement 118, 120. As shown in FIG. 5 the carbon fiber sheet mold compound reinforcement 118, 120 covered in encapsulating material 113, 113'.

Regarding the connection of the bracket 32, 33 to the respective mount areas 28, 30 it is within the scope of this invention for the bracket 32, 33 to be mechanically using adhesive, heat staking or resistive implant welding. It is also possible for the bracket 32, 33 to be connected by insert/over molding.

The use of the carbon fiber reinforced sheet molding compound reinforcement 18, 20 can take many forms and be located in the areas of the liftgate closure type panel that need the extra structure. The reinforcements 18, 20 could be located in the D Pillars, and could include header, and could even run around entire perimeter of the panel. The carbon fiber sheet mold compound reinforcement 18, 20 could be one piece, two piece, multiple pieces, and subassembled, or installed as loose pieces. Also allows for tether routing through or and with mechanical fasteners. Also allows for the routing and retention of wire harness and water line through inside or channeling on outside with retention features.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liftgate arrangement comprising:
an inner panel with an outer surface and an inner surface;
one or more carbon fiber sheet mold compound reinforcements connected to and extending across a portion of the outer surface of the inner panel, wherein said one or more carbon fiber sheet mold compound reinforcements has a channel extending between two openings on the one or more carbon fiber sheet mold compound reinforcements; and
one or more mount surface areas formed on an exterior surface of the one or more carbon fiber sheet mold compound reinforcements.

2. The liftgate arrangement of claim 1 further comprising a bracket connected to each of the one or more mount surface areas.

3. The liftgate arrangement of claim 1, wherein the one or more carbon fiber sheet mold compound reinforcements are formed of a material containing polymer and carbon fibers or glass fibers.

4. The liftgate arrangement of claim 1, wherein the one or more carbon fiber sheet mold compound reinforcements are connected to the inner panel by one selected from the group including adhesives, resistive implant welding, heat staking, fasteners and combinations thereof.

5. The liftgate arrangement of claim 1, wherein inner panel is formed of polymer material and at least a portion of the one or more carbon fiber sheet mold compound reinforcements are encapsulated in the polymer material of the inner panel.

6. The liftgate arrangement of claim 1, wherein the channel is filled with structural foam, thereby increasing the strength of the one or more carbon fiber sheet mold compound reinforcements.

7. The liftgate arrangement of claim 1, wherein the channel contains a tether that extends through the channel and connects two different points on the inner panel.

8. The liftgate arrangement of claim 1, wherein each of the one or more carbon fiber sheet mold compound reinforcements has an inside surface that rests against an attachment surface of the inner panel and a channel portion of the inside surface is spaced apart from the attachment surface of the inner panel to form the channel.

9. A liftgate arrangement comprising:
an inner panel with an outer surface and an inner surface having a lower perimeter surface area extending across substantially the entire width of the inner panel;
one or more carbon fiber sheet mold compound reinforcements connected to and extending across a portion of the outer surface of the inner panel, wherein said one or more carbon fiber sheet mold compound reinforcements has a channel extending between two openings on the one or more carbon fiber sheet mold compound reinforcements; and
one or more mount surface areas formed on an exterior surface of the one or more carbon fiber sheet mold compound reinforcements.

10. The liftgate arrangement of claim 9 further comprising a bracket connected to each of the one or more mount surface areas.

11. The liftgate arrangement of claim 9, wherein the one or more carbon fiber sheet mold compound reinforcements are formed of a material containing polymer and carbon fibers or glass fibers.

12. The liftgate arrangement of claim 9, wherein the one or more carbon fiber sheet mold compound reinforcements are connected to the inner panel by one selected from the group including adhesives, resistive implant welding, heat staking, fasteners and combinations thereof.

13. The liftgate arrangement of claim 9, wherein inner panel is formed of polymer material and at least a portion of the one or more carbon fiber sheet mold compound reinforcements are encapsulated in the polymer material of the inner panel.

14. The liftgate arrangement of claim 9, wherein the channel is filled with structural foam, thereby increasing the strength of the one or more carbon fiber sheet mold compound reinforcements.

15. The liftgate arrangement of claim 9, wherein the channel contains a tether that extends through the channel and connects two different points on the inner panel.

16. The liftgate arrangement of claim 9, wherein each of the one or more carbon fiber sheet mold compound reinforcements has an inside surface that rests against an attachment surface of the inner panel and a channel portion of the inside surface is spaced apart from the attachment surface of the inner panel to form the channel.

17. A liftgate arrangement comprising:
an inner panel with an outer surface and an inner surface;
one or more carbon fiber sheet mold compound reinforcements connected to and extending across a portion of the outer surface of the inner panel, wherein said one or more carbon fiber sheet mold compound reinforcements has a channel extending between two openings on the one or more carbon fiber sheet mold compound reinforcements, wherein the one or more carbon fiber sheet mold compound reinforcements are formed of a material containing polymer and carbon fibers;
one or more mount surface areas formed on an exterior surface of the one or more carbon fiber sheet mold compound reinforcements; and
wherein each of the one or more carbon fiber sheet mold compound reinforcements has an inside surface that rests against an attachment surface of the inner panel and a channel portion of the inside surface is spaced apart from the attachment surface of the inner panel to form the channel.

18. The liftgate arrangement of claim 17 further comprising a bracket connected to each of the one or more mount surface areas.

19. The liftgate arrangement of claim 17, wherein the one or more carbon fiber sheet mold compound reinforcements are connected to the inner panel by one selected from the group including adhesives, resistive implant welding, heat staking, fasteners and combinations thereof.

20. The liftgate arrangement of claim 17, wherein inner panel is formed of polymer material and at least a portion of the one or more carbon fiber sheet mold compound reinforcements are encapsulated in the polymer material of the inner panel.

21. The liftgate arrangement of claim 17, wherein the channel is filled with structural foam, thereby increasing the strength of the one or more carbon fiber sheet mold compound reinforcements.

22. The liftgate arrangement of claim 17, wherein the channel contains a tether that extends through the channel and connects two different points on the inner panel.

* * * * *